(12) United States Patent
Urban et al.

(10) Patent No.: US 10,297,009 B2
(45) Date of Patent: May 21, 2019

(54) APPARATUS AND METHOD FOR GENERATING AN EXTRAPOLATED IMAGE USING A RECURSIVE HIERARCHICAL PROCESS

(71) Applicant: INTERDIGITAL CE PATENT HOLDINGS, Paris (FR)

(72) Inventors: Fabrice Urban, Thorigne Fouillard (FR); Philippe Guillotel, Vern sur Seiche (FR); Laura Turban, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 58 days.

(21) Appl. No.: 15/538,647

(22) PCT Filed: Dec. 18, 2015

(86) PCT No.: PCT/EP2015/080462
§ 371 (c)(1),
(2) Date: Jun. 21, 2017

(87) PCT Pub. No.: WO2016/102355
PCT Pub. Date: Jun. 30, 2016

(65) Prior Publication Data
US 2017/0365037 A1    Dec. 21, 2017

(30) Foreign Application Priority Data

Dec. 22, 2014 (EP) .................................. 14307148

(51) Int. Cl.
*G06K 9/62* (2006.01)
*G06T 3/40* (2006.01)
(Continued)

(52) U.S. Cl.
CPC ............ *G06T 3/403* (2013.01); *G06K 9/6212* (2013.01); *G06T 3/4007* (2013.01);
(Continued)

(58) Field of Classification Search
None
See application file for complete search history.

(56) References Cited

U.S. PATENT DOCUMENTS

| 8,385,678 B2 | 2/2013 | Lim et al. |
| 2004/0244030 A1 | 12/2004 | Boyce et al. |

(Continued)

FOREIGN PATENT DOCUMENTS

| CN | 102881006 | 1/2013 |
| CN | 103632348 | 3/2014 |

(Continued)

OTHER PUBLICATIONS

Yan Zhao, Dong Tian, M. M. Hannukasela and M. Gabbouj, "Spatial error concealment based on directional decision and intra prediction," 2005 IEEE International Symposium on Circuits and Systems, Kobe, 2005, pp. 2899-2902 vol. 3. doi: 10.1109/ISCAS.2005.1465233 (Year: 2009).*

(Continued)

*Primary Examiner* — Kim Y Vu
*Assistant Examiner* — Nathan J Bloom
(74) *Attorney, Agent, or Firm* — Jeffrey M. Navon

(57) ABSTRACT

Apparatus and Method for Generating an Extrapolated Image Using a Recursive Hierarchical Process A method and apparatus for generating an extrapolated image from an existing film or video content, which can be displayed beyond the borders of the existing film or video content to increase viewer immersiveness, are provided. The present principles provide for hierarchical processing in which higher resolution images are generated at each higher level, (Continued)

and wherein the higher level image is generated based on prediction and weighting derived from a current level image, and the current level is refined for the prediction based on overlapping data.

16 Claims, 7 Drawing Sheets

(51) Int. Cl.
*G06T 7/44* (2017.01)
*G11B 27/34* (2006.01)
*G11B 27/034* (2006.01)

(52) U.S. Cl.
CPC .............. *G06T 3/4023* (2013.01); *G06T 7/44* (2017.01); *G11B 27/034* (2013.01); *G11B 27/34* (2013.01); *G06K 2009/6213* (2013.01)

(56) References Cited

U.S. PATENT DOCUMENTS

| | | | | |
|---|---|---|---|---|
| 2009/0268810 | A1* | 10/2009 | Dai | G06T 9/20 375/240.12 |
| 2010/0195716 | A1* | 8/2010 | Klein Gunnewiek | H04N 19/597 375/240.08 |
| 2012/0314767 | A1* | 12/2012 | Wang | H04N 19/105 375/240.12 |
| 2014/0003507 | A1* | 1/2014 | Asano | H04N 19/597 375/240.12 |
| 2014/0119456 | A1* | 5/2014 | Bivolarsky | H04N 19/46 375/240.25 |
| 2015/0350566 | A1* | 12/2015 | Hu | H04N 5/2628 348/581 |
| 2017/0150130 | A1* | 5/2017 | Kimura | H04N 13/271 |
| 2017/0251224 | A1* | 8/2017 | Lee | H04N 19/597 |

FOREIGN PATENT DOCUMENTS

| | | |
|---|---|---|
| WO | WO2004006570 | 1/2004 |
| WO | WO2006003600 | 1/2006 |
| WO | WO2013131851 | 9/2013 |

OTHER PUBLICATIONS

Novy, D., Computational Immersive Displays, Masters Thesis, Media Arts & Sciences, Massachusetts Institute of Technology, Jun. 2013, pp. 1-79.

Mills et al., "Surround Video", Networked & Electronic Media (NEM) Summit, Turin, Italy, Sep. 27, 2011, pp. 1-9.

Roweis et al., "Nonlinear Dimensionality Reduction by Locally Linear Embedding", Science, vol. 290, Dec. 22, 2000, pp. 2323-2326.

Aides et al., "Multiscale Ultrawide Foveated Video Extrapolation", 2011 IEEE International Conference on Computational Photography (ICCP), Pittsburgh, Pennsylvania, USA, Apr. 8, 2011, pp. 1-8.

Jones et al., "IllumiRoom: Peripheral Projected Illusions for Interactive Experiences", ACM SIGGRAPH 2013 Emerging Technologies, Anaheim, California, USA, Jul. 21, 2013, Article No. 7, p. 1.

Lainema et al., "Intra Coding of the HEVC Standard", IEEE Transactions on Circuits and Systems for Video Technology, vol. 22, No. 12, Dec. 2012, pp. 1792-1801.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Jones et al., "IllumiRoom: Peripheral Projected Illusions for Interactive Experiences", ACM SIGCHI 2013 Changing Perspectives, Paris, France, Apr. 27, 2013, pp. 869-878.

Mills et al., "Surround Video", British Broadcasting Corp., Research and Development White Paper, WHP 208, Dec. 2011, pp. 1-34.

Turban et al., "Extrafoveal Video Extension for an Immersive Viewing Experience", IEEE Transactions on Visualization and Computer Graphics, vol. 23, No. 5, May 2017, pp. 1520-1533.

Avraham Etal., "Ultrawide Foveated Video Extrapolation", IEEE Journal of Selected Topics in Signal Processing, vol. 5, No. 2, Apr. 2011, pp. 321-334.

* cited by examiner

100

200 ns are to be read in this light, and not as admissions of
APPARATUS AND METHOD FOR GENERATING AN EXTRAPOLATED IMAGE USING A RECURSIVE HIERARCHICAL PROCESS This application claims the benefit, under 35 U.S.C. § 365 of International Application PCT/EP2015/080462, filed Dec. 18, 2015, which was published in accordance with PCT Article 21(2) on Jun. 30, 2016, in English, and which claims the benefit of European Patent Application 14307148.8, filed Dec. 22, 2014.

TECHNICAL FIELD

This invention relates to an apparatus and a method for processing images, and in particular, an apparatus and method for extrapolating an existing film or video to generate extrapolated images that extend beyond the borders of the existing film or video.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

REFERENCED DOCUMENTS

[1] METHOD OF AND SYSTEM FOR CONTROLLING AN AMBIENT LIGHT AND LIGHTING UNIT, WO2004006570 (A1)—2004 Jan. 15
[2] DOMINANT COLOR EXTRACTION USING PERCEPTUAL RULES TO PRODUCE AMBIENT LIGHT DERIVED FROM VIDEO CONTENT, WO2006003600 (A1)—2006 Jan. 12
[3] P. Mills, A. Sheikh, G. Thomas, and P. Debenham. BBC research & development, white paper WHP 208—surround video. page 34. 2011.
[4] D. E. Novy. Computational immersive display. 2013.
[5] Jones, Brett R; Benko, Hrvoje; Ofek, Eyal; Wilson, Andrew D (2013). "IllumiRoom: Peripheral Projected Illusions for Interactive Experiences". 2013.
[6] A. Aides, T. Avraham, and Y. Schechner. Multiscale ultrawide foveated video extrapolation. In 2011 IEEE International Conference on Computational Photography (ICCP), pages 1-8. 2011.
[7] J. Lainema, F. Bossen, W. Han, J. min, K. Ugur. Intra Coding of the HEVC Standard. In *IEEE Transactions on Circuits and Systems for Video Technology*, vol. 22, no. 12, pages 1792-1801. December 2012.
[8] Sam Roweis & Lawrence Saul. Nonlinear dimensionality reduction.

Image Extrapolation techniques may be used to generate extrapolated images for display beyond the borders of an existing film or video image to improve viewer immersiveness while viewing a film or video content. The image extrapolation may be performed based on content in the images to be extended. Such extension seeks to increase the field of vision by projecting content around the screen to surround the spectator with the extended images along with the main image of the film or video.

An example arrangement for displaying such extrapolated images is shown in FIG. 1. The main image from the film or video content is displayed on main screen 110, while the extrapolated images are displayed beyond the borders of the main screen 110 on display areas 120, 130 and/or 140 to provide the feeling of immersiveness.

The images may be projected onto the various display areas using different arrangements including those shown in FIGS. 2 and 3. In FIG. 2, a single projection 250 is displayed on main screen 210, and portions of projection 250 is displayed on screens 220, 230 and/or 240. In FIG. 3, arrangement 310 includes a center projection that projects the film or video content onto the center display screen, while 320 includes a left projection that projects the extrapolated image onto the left display screen and 330 includes a right projection that projects the extrapolated image onto the right display screen. Although not shown, a projection may also be provided for an above or below display screen.

Various systems for projecting specific displays or images around the borders or a film or video have been proposed.

In an Ambilight System developed by Philips Corporation [1], the distribution of colors in the image is studied [2] and a selected main color is projected around the screen using RGB LEDs mounted on the edges of the TV. Smart light bulbs can be added to the setup that can change colors according to the image displayed on the screen. The light projection is done around the TV in a limited area, but provides no detail of background nor shape nor motion impression.

A system proposed by Mills et al. [3] comprises a projection system for content acquired with 2 cameras. However, this system doesn't focus on content creation and does not apply image extrapolation to existing content.

The Infinity-by-nine, developed by the MIT Media Lab [4], aims to create an immersive display for TV. The system uses three projectors and 3 screens (on the ceiling and on both sides of the room) to enhance the program displayed on a TV screen. The content on the additional screens is computed in real time from the TV content. The content is created at scene changes and updated from estimated camera motion. Because the technique relies on the motion estimation, it may not work so well for fast changing scenes, scenes with flashes, or scenes with large motion.

IllumiRoom, proposed by Microsoft [5], uses a Kinect sensor and a projector to enhance the TV content by projecting images around a television display. It was mostly developed for immersive gaming to give the illusion that what happens in the game also happens in the player's room. The system projects images directly onto the furniture and walls surrounding the television display to convey events happening beyond the main image on the screen. However, this system does not address the content creation by image extrapolation, that is extrapolating based on content of the image. Content is mostly computer generated by the game renderer.

The Ultrawide Foveated Video Extrapolation [6] extrapolates video content around the center image. The key idea of the algorithm is to use a Patch-Match algorithm in space and time dimensions (using video cubes, instead of image blocks) to extrapolate the video outside of its borders. When choosing the right patch, they also penalize patches that are likely to cause distraction (i.e. patches that add many edges outside of the video). The patch used is also selected at random among a few patches with similar cost, to avoid an unnatural repetition of the same patch. To limit computation, the search for a fitting patch is limited to a certain area in the original input video, close to the pixels that are being filled, and the search area is extended if necessary. This algorithm takes several minutes to extrapolate one frame, and as such, may be difficult to implement in real time. The algorithm uses a multi-scale approach to begin the extrapolation at a coarse resolution and refining the resolution in further steps. This technique ensures smooth extrapolation but is very computationally intensive. In addition, the penalization of edge areas does not take into account the human visual system to determine whether the edge is distracting or not. The extrapolated video can miss some relevant structures.

SUMMARY

The present principles are directed to improvement in an apparatus and a method for extrapolating images from original film and video content.

In one respect, the present principles provide a method of generating an extrapolated image that extends beyond a border of an image, comprising: accessing a portion of the image; generating a first extrapolated image based on the portion of the image, including using Intra prediction to determine an estimated angle of prediction and propagating a predicted block in the first extrapolated image at the estimated angle; and generating a second extrapolated image based on prediction and weighting determined from blocks of the first extrapolated image, wherein the second extrapolated image is higher resolution than the first extrapolated image.

In an embodiment according to the present principles, the steps of generating a higher resolution level based on prediction and weighting from a current level may be repeated N number of times based on the desired resolution and the computing resources available.

In another respect, the present principles provides an apparatus for generating an extrapolated image that extends beyond a border of an image, comprising: an input configured to access an image; and a processor configure to access a portion of the image, generate a first extrapolated image based on the portion of the image, including using Intra prediction to determine an estimated angle of prediction and propagating a predicted block in the first extrapolated image at the estimated angle, and generate a second extrapolated image based on prediction and weighting determined from blocks of the first extrapolated image, wherein the second extrapolated image is higher resolution than the first extrapolated image.

In an embodiment according to the present principles, the processor is configured to repeat the process of generating a higher resolution level based on prediction and weighting from a current level N number of times based on the desired resolution and the computing resources available.

In another respect, the present principles provide a computer program product stored in a non-transitory computer-readable storage media, comprising computer-executable instructions for: accessing a portion of the image; generating a first extrapolated image based on the portion of the image, including using Intra prediction to determine an estimated angle of prediction and propagating a predicted block in the first extrapolated image at the estimated angle; and generating a second extrapolated image based on prediction and weighting determined from blocks of the first extrapolated image, wherein the second extrapolated image is higher resolution than the first extrapolated image.

In an embodiment according to the present principles, the computer-executable instructions repeat the process of generating a higher resolution level based on prediction and weighting from a current level N number of times based on the desired resolution and the computing resources available.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The description set out herein illustrates exemplary embodiments for implementing various aspects of the present principles. Such examples are not to be construed as limiting the scope of the claims in any manner.

DETAILED DESCRIPTION

The present principles relate to an improved apparatus and method for generating extrapolated images that extend beyond the borders, or edges, of an existing film or video content. The present principles advantageously provide the features of:

Prediction (or prefilling) of the extrapolation image with blurring and HEVC angular prediction used for block propagation. To estimate the angular prediction, intra mode prediction from HEVC is used. In this case, the prediction is used to propagate structures rather than its conventional use in terms of compression. HEVC Intra prediction provides an angle for predicting content based on its surrounding, and an estimate of the efficiency of the estimation (through coding cost). Another possible technique is using different tools and integrating them together (detecting the orientation of gradients, estimating the main gradient, and finding a prediction).

Hierarchical computing of the extrapolated image (computation is made at a lower resolution and adapted to the higher resolution to save computational time).

Usually, computations done at lower resolution are used as prediction and computations are made once again at the current level, typically resulting in a reduced local search. The multi-resolution allows to narrow the search range around a prediction. In our case, the search is done at lower resolution, and the result is directly applied at higher resolution. Of course, this is in the case of 2 resolution levels. For more resolution levels, the result at level N is used as a prediction to narrow the search at this level and apply the result at level N−1, recursively until level 0

"Overlapping patches" based recursive completion. The overlapping area is used as already known data for block matching (or patch-match). So the available data to find a matching block for the current block is both the coarse estimation and the overlapping area. If no overlapping is used, every block is computed independently. There will be no consistency between neighboring block, and block artifacts will be visible. Moreover, the block artifacts are even more reduced using blending between overlapping areas of the block.

Local linear embedding on N layers (LLE) allows using multiple references to compute a block prediction. The combining weights estimated on already computed area allow a closer match for the current block. This also avoids creating mosaic artifacts because combining several predictions allows creating new content.

Figure 1:
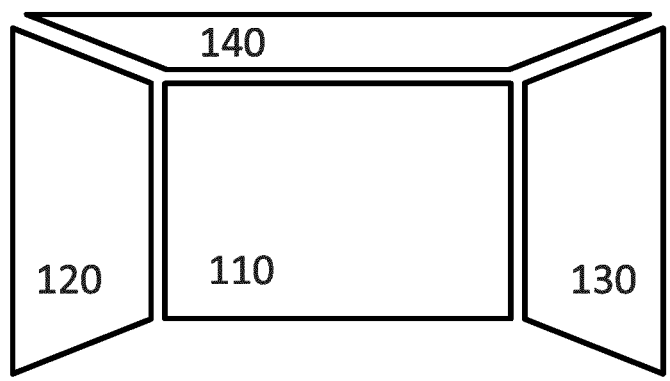
FIG. 1 shows an exemplary arrangement for displaying extrapolated images beyond the borders of a film and/or video display.
Figure 2:
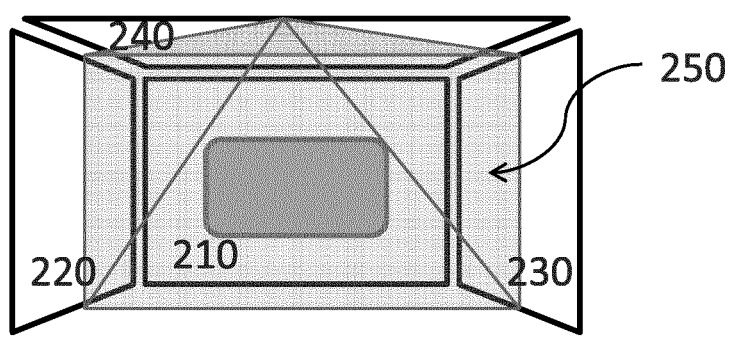
FIG. 2 shows an exemplary arrangement for projecting a image onto various display screens.
Figure 3:
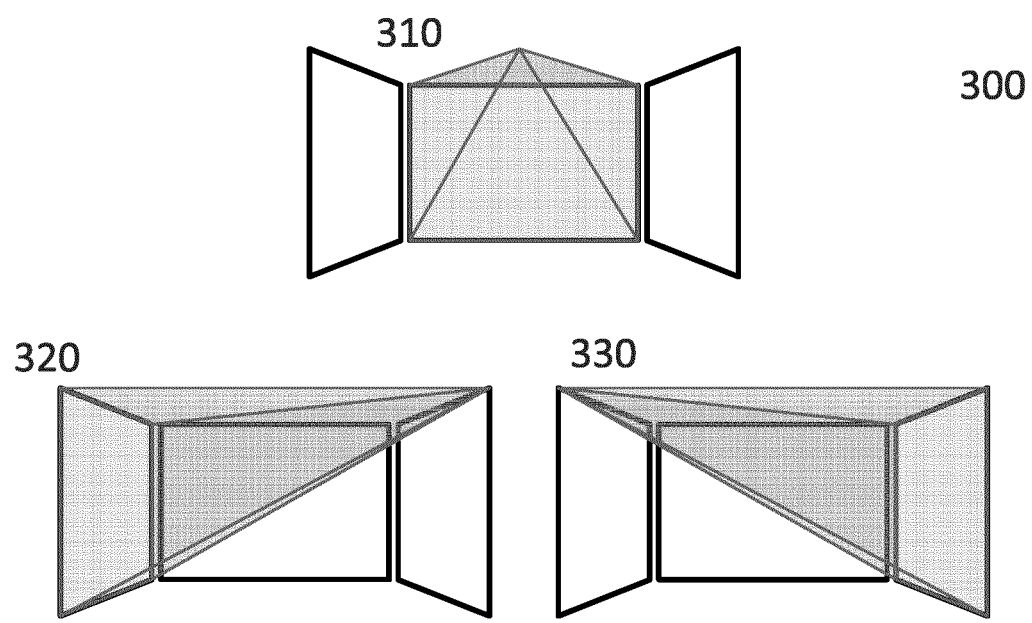
FIG. 3 shows an exemplary arrangement for projection images onto various display screens.
Figure 4:
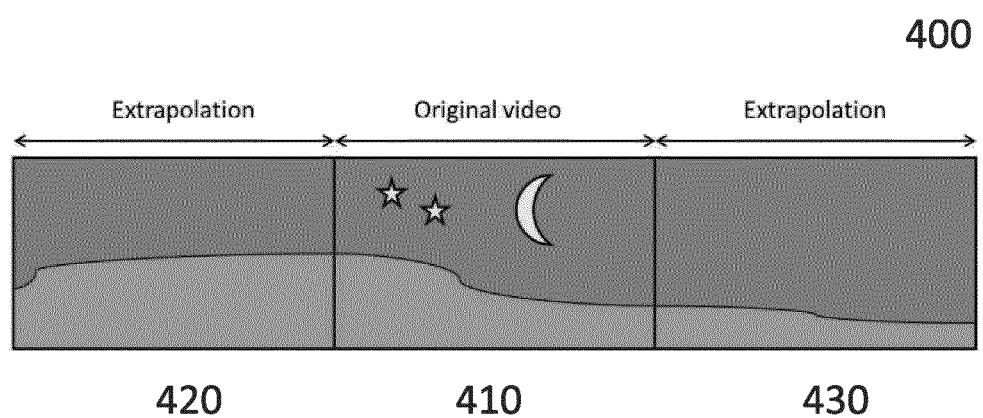
FIG. 4 illustrates an exemplary image including an original image and extrapolated images generated and displayed beyond the left and right borders of the original image.

FIG. 4 illustrates an example image display having extrapolated images 420 and 430 generated based on an original image 410. It can be seen that the respective extrapolated images are different and generated in a manner to extend the original image beyond both the left and right borders of the original image 410.

The present principles rely on hierarchical processing to generate the extrapolated image, and therefore a Gaussian multi-resolution pyramid of N levels of the input image is computed (lowest resolution at level N−1 and highest resolution at level 0). The extension of level i is done using computations made at lower resolution level i+1.

In addition, texture propagation is done from block to block spatially, leading to some recursive texture propagation.

The pyramidal decomposition as well as the filtering process takes advantage of the human visual properties, and especially the visual properties at the periphery to provide a better, more immersive experience. In particular the extrapolated images take advantage of low resolution acuity and high sensibility to moving objects and structures.

In our explanation we will consider generating an extrapolated image to extend the image on the right side. It is to be understood that similar processing, with appropriate change in orientation, can be used to generate an extrapolated image for extending the image beyond the left edge of the image. Also, the same procedure can also be used to extend the image above and below the screen. Small adjustments in the scanning order may be made to extend the image all around the central screen.

According to the present principles, hierarchical processing is performed in which higher resolution images are generated at each higher level, and wherein the higher level image is generated based on prediction and weighting derived from a current level image, and the current level is refined for the prediction based on overlapping data.

Lowest Level (Level=N−1)

Figure 5:
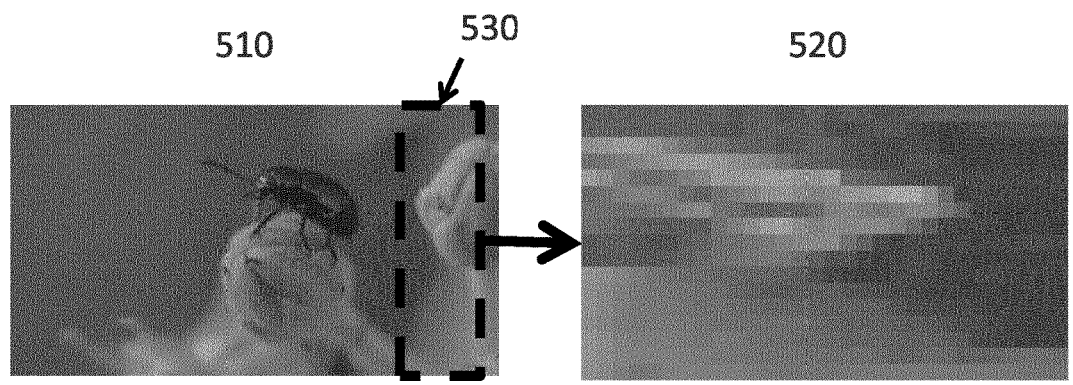
FIG. 5 illustrates an aspect of generating an extrapolated image in accordance with the present principles.

A coarse prediction of the extension is made at the lowest level of the pyramid. This process is shown in FIG. 5.

To do this first prediction, an image portion 530 of the input image 510 on the right border is extracted and resized to fit extension area using bilinear interpolation. The extracted, resized image is then flipped horizontally (in order not to lose edge continuity on the border) and blurred, for example, using the normalized box filter of size 25 to produce an initial extrapolated image 520. The size of the extracted image portion 530 may be varied as desired. The portion that is extracted must be large enough to contain data (at least a few pixels), and small enough not to recognize the image. ⅒ of the image width was found to be a good width based on the tradeoffs.

As an option, the rightmost pixels on the right edge of input image 510 can be discarded by shifting this selected area to avoid extending a black border or unwanted pixels that can appear in the border of the image.

Figure 6:
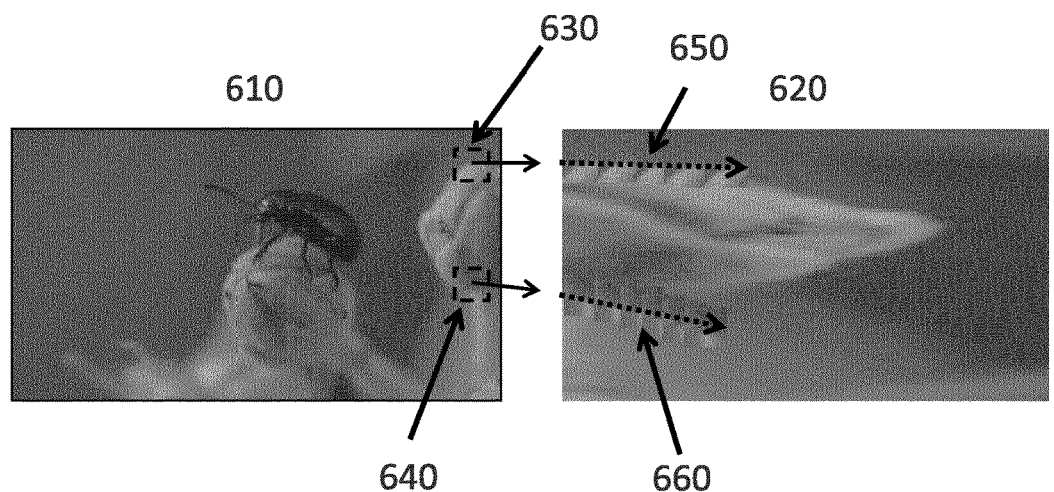
FIG. 6 illustrates an aspect of generating an extrapolated image in accordance with the present principles.

On top of this blurry prediction, an estimate of the direction of each block on the border is computed, for example, using the HEVC angular prediction [7], where the 34 HEVC directions are used. After evaluating the angle of the block, if the predicted block is similar enough to the original block, it (the predicted block) is propagated on the extension with the estimated angle starting from the position of the original block as shown in FIG. 6. Here, block 630 is propagated in direction 650, and block 640 is propagated in direction 660. This prediction aims at propagating regular structures. This process propagates structures with the correct direction which may not be the case of the mirrored coarse estimate above.

Essentially, the angular prediction is performed for each block at the right most end of the image, wherein the estimation and prediction is done on the original image and then propagated on the extrapolated image. Some rightmost pixels can be discarded to avoid wrong prediction when a black border is present on the edge of the image. These blocks can be overlapping. First the best HEVC intra prediction is estimated. The chosen mode defines the angle of the structure in the block. Then if the prediction is similar enough to the block, the block is propagated on the extension following the estimated angle. 2 methods are possible.
  1. The block is copied and pasted, following a line starting at the block and having the direction of the predicted angle. This solution can propagate details of the block, existing texture.
  2. Computing the HEVC intra prediction with chosen mode (angle) for the block. Pasting this prediction following the estimated structure direction angle. This solution propagates only main structure in the block.

Level i, i<N−1

The prediction at a level i<N−1 is the extension computed during the refining step at level i+1.

Refining the Extension for a Level i, i≠0

When computing at a level i, the algorithm actually computes an extension for both levels i and i−1 while doing all the computing at level i, inspired by a similar technique as the one used for super resolution. If i>1, the extension of level i−1 computed at level i will serve as a prediction, otherwise if i=1 the extension of level i−1=0 computed at level i=1 will be the final extension.

Recursive Overlapping Block

Figure 9:
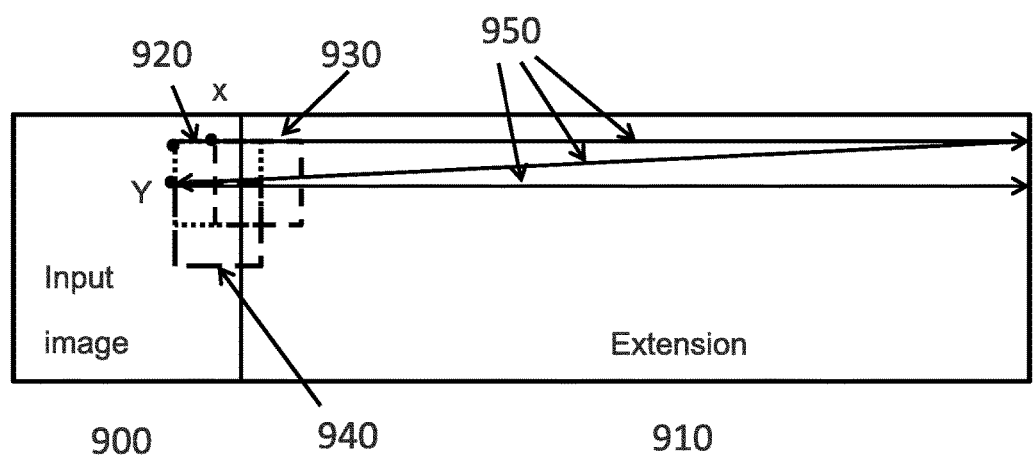
FIG. 9 illustrates an aspect of block matching in an extrapolated image in accordance with the present principles.

The predicted extension is refined by selecting blocks that will be patched, starting from a block at the top left corner of the extension half overlapping the input image to a block at the lower right corner of the extension (kind of zig-zag scanning order), with a step of x pixels along the horizontal axis and y pixels along the vertical axis (it means that extrapolated blocks overlap partly each other). Final fusion between overlapping pixels will be done by blending the pixel values to generate a blended block. Blocks are selected from left to right and top to bottom. This aspect of the present principles is illustrated in FIG. 9, wherein overlapping exemplary blocks 920, 930 and 940 are processed. The processing sequentially continues for the blocks disposed along the direction of arrows 950 for extension portion 910.

It is to be understood that the values of x and y may be adjusted as desired. Lower values of x and y will result in less block effect on the final extension, while higher values of x and y, will result in faster processing.

Block Matching

The selected block at level i will be called $B^i$ and is associated with the corresponding block $B^{i-1}$ at level i−1 (co-located block).

The goal is to reconstruct the block $B^i$ of the extrapolated image. In this step we find good candidates for this unknown block. We are reconstructing overlapping blocks, which means part of the block is already reconstructed (left and top part). The known part is used as a template to find nearest blocks in the reference search area. This is also known as "template matching" technique.

A block matching algorithm finds the K nearest neighbors (K-NN) of the block $B^i$. In our case, the block matching relies on the sum of the squared difference. Those K-NN will be referenced from now on as the patches $P_j^i$ with $1 \leq j \leq K$.

$$P_j^i = \operatorname*{argmin}_{S \in \Omega \setminus \{P_1^i, \ldots, P_{j-1}^i\}} SSD(B^i, S)$$

Where SSD is the sum of squared difference and Ω the search window in the input.

Local Linear Embedding (LLE) on Template at Level

A technique called LLE is used to compute the patch that refines the extension. The LLE guarantees stability in the extension because it combines various patches which prevents adding distractions or details in the extension. Details are not necessary since human peripheral vision can't detect them and it could distract the eye (i.e. force the user to turn his/her head to see the details with foveal vision) instead of improving immersion.

The weights $w_j$ minimizing the following equation are computed through LLE optimization:

$$B^i(T) - \Sigma w_j P_j^i(T)$$

Where T is a template created to take into account the pixels that were refined previously and we ignore the pixels that were only predicted but not yet refined (typically an inverse-L shape).

Alternatively, the template is not used and the whole current block is considered.

A final patch $P^i$ is obtained:

$$P^i = \Sigma w_j P_j^i$$

As an improvement, in order to ensure that only coherent blocks, in the sense that the blocks are good matching blocks in terms of the block matching criterion, are used, blocks $P_j^i$ with an SSD value too high ($SSD(B^i, P_j^i) \geq q$) can be rejected:

$$P^i = \sum_{j \in [1,K] | SSD(B^i, P_j^i) < q} w_j P_j^i$$

From the patches $P_j^i$ we deduce corresponding patches $P_j^{i-1}$ at the corresponding positions (co-located) at level i−1, with the weights computed at level i, and a final patch $P^{i-1}$:

$$P^{i-1} = \Sigma w_j P_j^{i-1}$$

or (with rejection):

$$P^{i-1} = \sum_{j \in [1,K] | SSD(B^i, P_j^i) < q} w_j P_j^{i-1}$$

Note that the weights are only computed at level i.

Alternatively the PatchMatch algorithm could be used instead of K-NN search and LLE. PatchMatch is a fast algorithm for computing dense approximate nearest neighbor correspondences between patches of two image regions. It is well-known from the computer vision community.

Figure 7:
FIG. 7 illustrates an aspect of generating an extrapolated image in accordance with the present principles.
Figure 8:
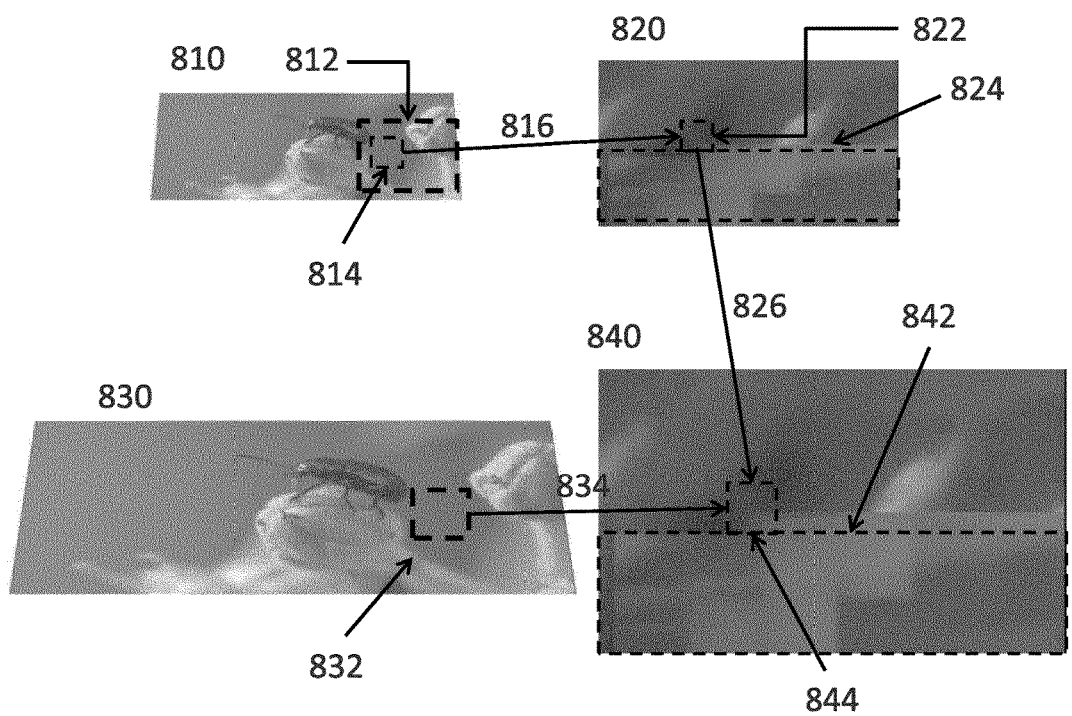
FIG. 8 illustrates an aspect of generating an extrapolated image in accordance with the present principles.

FIG. 7 shows the original image and the coarse resolution image that was generated as described above. The process of determining the blocks of the extrapolated image in hierarchical manner is shown in FIG. 8. Images 810 and 820 are associated with level i, while images 830 and 840 are associated with level i−1. In image 820, block 822 is associated with one or more blocks 814 within search area 812. Weights are estimated to determine block 822. The position of block(s) 814 is used to determine the block(s) 832 in level i−1. The weights determined for block 822 are then associated with block(s) 832 and used, for example, by the blending technique described below, to generate block 844. The remaining blocks are sequentially processed in a similar manner to generate the blocks to be filled in for portion 842 of the extrapolated image 840.

Blending

The final patches $P^i$ and $P^{i-1}$ are blended into the extensions of levels i and i−1 respectively, to prevent visible seams or block effect, in a way similar to alpha blending. We consider blending-masks $M_1^i$, $M_2^i$, $M_1^{i-1}$, $M_2^{i-1}$ where:

$\forall x,y, \ 0 \leq M_1^i(x,y) \leq 1$ $\forall x,y, \ 0 \leq M_2^i(x,y) \leq 1$ $\forall x,y, \ 0 \leq M_1^{i-1}(x,y) \leq 1$ $\forall x,y, \ 0 \leq M_2^{i-1}(x,y) \leq 1$ $\forall x,y, \ M_1^i(x,y) + M_2^i(x,y) = 1$ and $\forall x,y, \ M_1^{i-1}(x,y) + M_2^{i-1}(x,y) = 1$.

The blending equation becomes:

$$F^i = M_1^i \therefore P^i + M_2^i \therefore B^i$$

$$F^{i-1} = M_1^{i-1} \therefore P^{i-1} + M_2^{i-1} \therefore B^{i-1}$$

Where $\therefore$ is an element-wise multiplication and $F^i$ and $F^{i-1}$ the final refined blocks in the extension of levels i and i−1 respectively.

This blending is done so that pixels $p_{x,y}$ that were not refined are taken from the new patch ($M_1^i(x,y)=1$ and $M_2^i(x,y)=0$). Pixels that were already refined in $B^i$ are weighted with the pixels in $P^i$ in a way that the farther pixels are from the not-refined-area of the patch (i.e. the more pixels were already refined in a previous step), the higher the weight of the original pixel in $B^i$ is. The same goes for level i−1.

Hierarchical Computing

As soon as a level i is done, the algorithm moves on to the level i−1 until it reaches the level 0. The prediction of level i−1 is based on the extrapolated image that was just computed during the refining step at level i. The final extrapolated image is the one computed for level 0 at level 1. It is to be understood that the number of levels processed to generate the final extrapolated image may be varied as desired. Higher number of levels will require increased amount of processing, but will generally provide a higher resolution final image, while lower number of levels will require less amount of processing, but will generally provide a lower resolution.

The resolution of the final image also depends on the resolution of the lowest resolution level and the size ratio between 2 levels. The ratio between two levels can be any value. We can work with 2 levels and have very low resolution and HD. In sum, the point of the hierarchical process is to start from easy processing (low detail resolution) and progressively add resolution using a reliable prediction. With an increased number of levels, the robustness will be improved. The start and end resolutions and the number of levels can vary to have a trade-off between computation cost and robustness.

Figure 10:
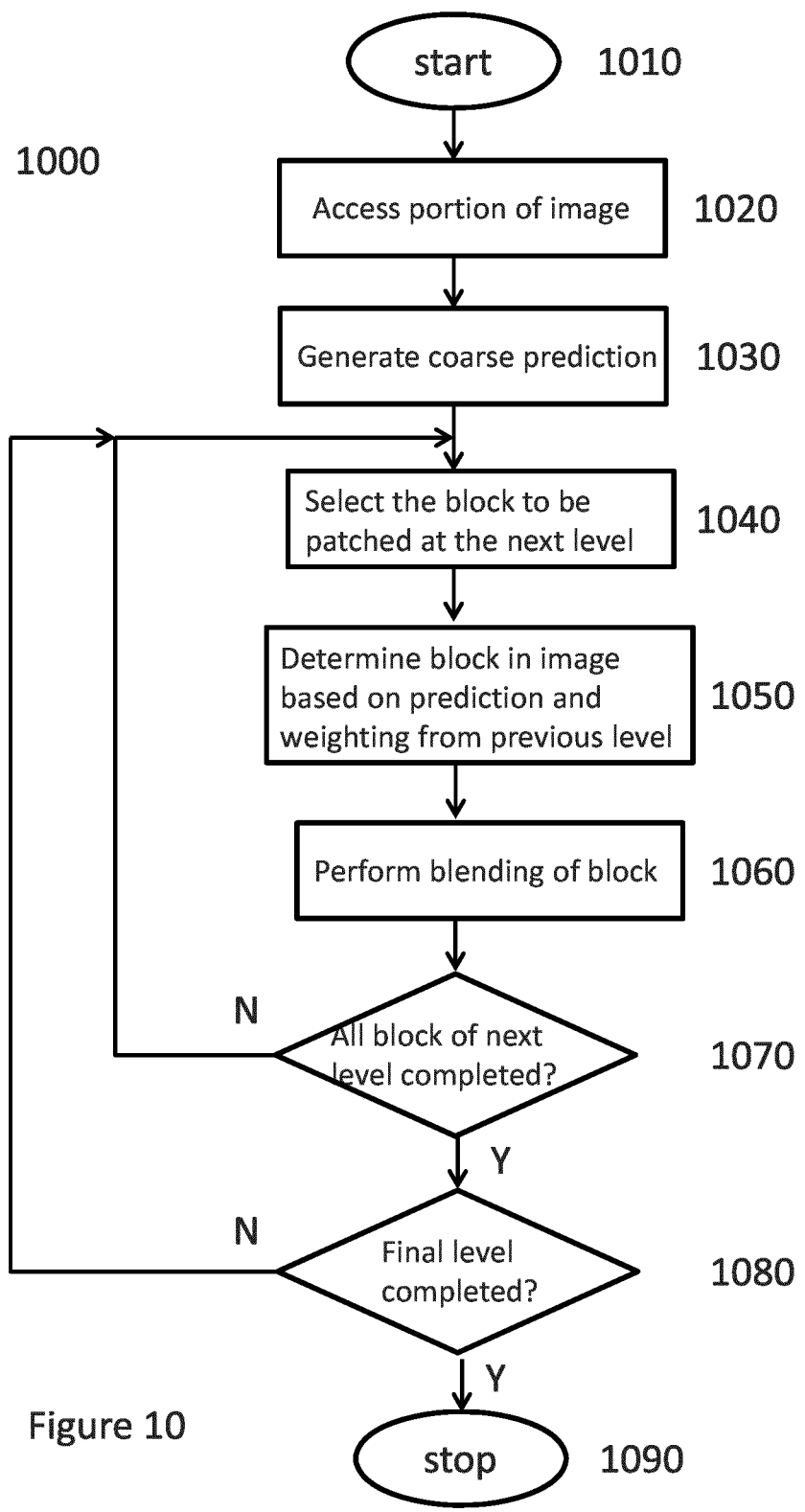
FIG. 10 illustrates an exemplary process for generating an extrapolated image in accordance with the present principles.

An exemplary process for generating an extrapolated image according to the present principles is illustrated in FIG. 10. Process 1000 begins at step 1010, and first accesses a portion of an image in 1020. A coarse prediction is generated in step 1030, followed by the hierachical processing of the levels. The processing includes selecting the block to be patched in 1040, determining a block in the image based on the prediction and weighting from level i in 1050, performing a blending of the pixel values to generate the new block in 1060, and determining whether all of the blocks of the extrapolated image has been processed in 1070. If not, the process repeats steps 1040-1060 until all of the blocks have been processed. If so, the process checks whether the final level has been processed. If not, the process repeats steps 1040-1070 until the final level has been processed. If so, the process stops and the final extrapolated image has been generated.

Figure 11:
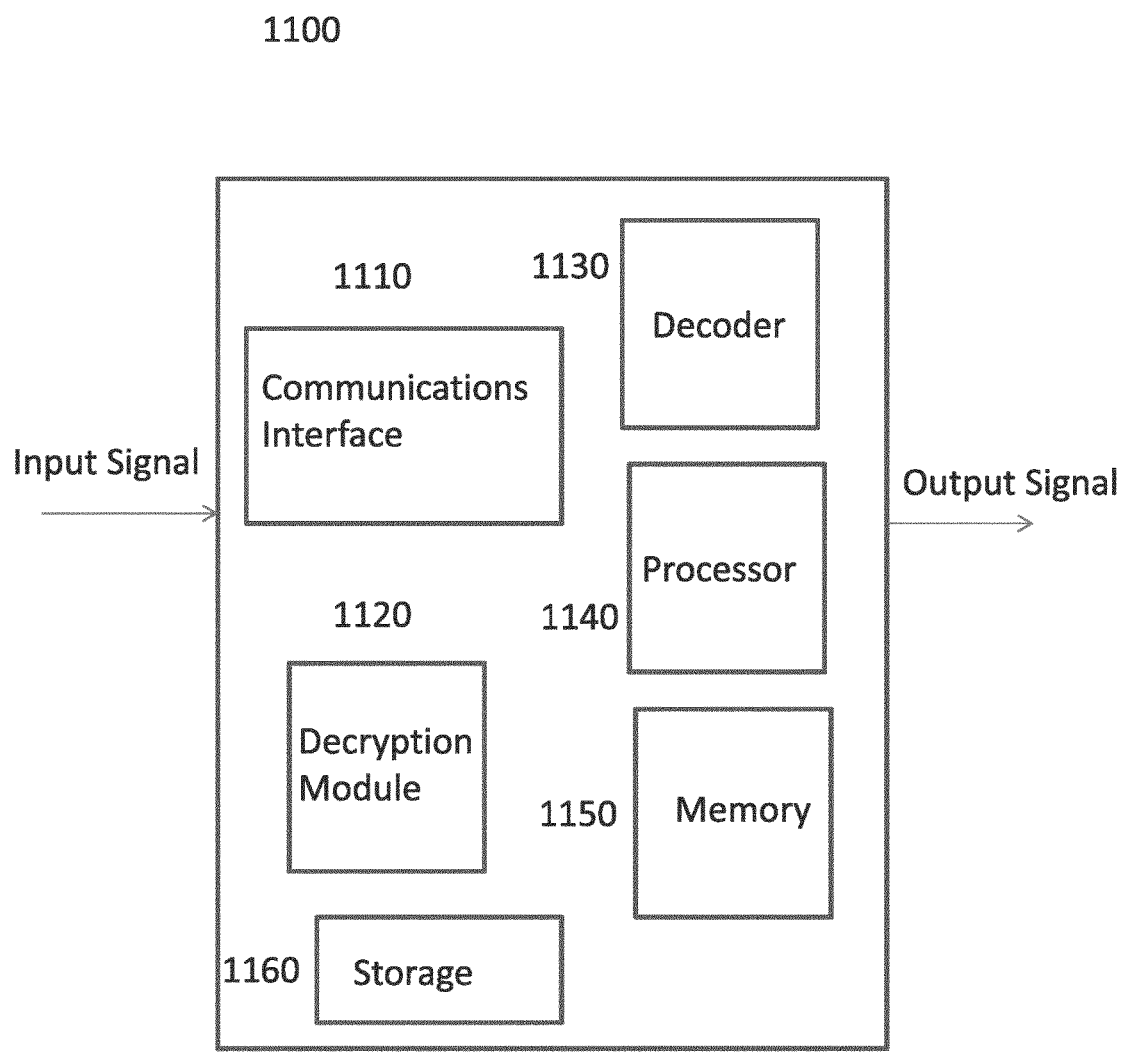
FIG. 11 illustrates an exemplary apparatus for generating and/or processing an extrapolated image in accordance with the present principles.

FIG. 11 illustrates a block diagram of an exemplary system in which various aspects of the exemplary embodiments of the present principles may be implemented. System 1100 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1100 may be communicatively coupled to other components, for example, a signal receiving apparatus, a projection system, a display system, or the like, to both receive film and video data, process the film and video data as described above, and project or display the extrapolated images with the received film and video data to provide the immersive viewer experience.

The system 1100 may include at least one processor(s) 1140 configured to execute instructions loaded therein for implementing the various processes as discussed above. Processor(s) 1140 may include embedded memory, input output interface and various other circuitry as known in the art. The system 1100 may also include at least one memory 1150 (e.g., a volatile memory device, a non-volatile memory device). System 1100 may additionally include a storage device 1160, which may include non-volatile memory, including, but not limited to, EEPROM, ROM, PROM, RAM, DRAM, SRAM, flash, magnetic disk drive, and/or optical disk drive. The storage device 1160 may comprise an internal storage device, an attached storage device and/or a network accessible storage device, as non-limiting examples. Program code to be loaded onto processor(s) 1140 to perform the various processes described hereinabove may be stored in storage device 1160 and subsequently loaded onto memory 1150 for execution by processor(s) 1140. System 1100 may also include a decryption module 1120 configured to receive and decrypt encrypted film and/or video data. The image data generated by processor(s) 1140 may be output via an output port to display device(s), or alternatively system 1100 may be integrated with a display, wherein the output signal is directly applied to display the images on a display of system 1100.

System 1100 may include a decoder 1130 that decodes the received input signals as necessary, which may be in compressed form in accordance with any of the known compression formats, for example, MPEG2 or H.264. Decoder 1130 may be implemented as a separate component within system 1100 or may be incorporated as a part of processor(s) 1140 as known in the art. Decryption module 1120 represents the module(s) that may be included in a device to perform the decryption functions. As is known, a device may include one or both of the encryption and decryption modules, for example, encryption may be done on a regular PC since encryption does not involve secret key so that the PC need not include secure memory for storing the input parameters (i.e., the public system parameters and the user's identity). Decryption however, requires secret keys (i.e., the decryption key) and is done in a secure device, for example a smart card. Additionally, decryption module 1120 may be implemented as a separate element of system 1100 or may be incorporated within processor(s) 1140 as a combination of hardware and software as known to those skilled in the art.

The system 1100 may also include communications interface 1110 that enables communication with other devices via a communications channel, either wired or wireless. The communications interface 1110 may include, but is not limited to a transceiver configured to transmit and receive data from the communications channel. The communications interface may include, but is not limited to, a modem or network card and the communications channel may be implemented within a wired and/or wireless medium. The various components of system 1100 may be connected or communicatively coupled together using various suitable connections, including, but not limited to internal buses, wires, and printed circuit boards.

The exemplary embodiments of this invention may be carried out by computer software implemented by the processor(s) 1140 or by hardware, or by a combination of hardware and software. As a non-limiting example, the exemplary embodiments of this invention may be implemented by one or more integrated circuits. The memory 1150 may be of any type appropriate to the technical environment and may be implemented using any appropriate data storage technology, such as optical memory devices, magnetic memory devices, semiconductor-based memory devices, fixed memory and removable memory, as non-limiting examples. The processor(s) 1140 may be of any type appropriate to the technical environment, and may encompass one or more of microprocessors, general purpose computers, special purpose computers and processors based on a multi-core architecture, as non-limiting examples.

The foregoing has provided by way of exemplary embodiments and non-limiting examples a description of the method and systems contemplated by the inventor. It is clear that various modifications and adaptations may become apparent to those skilled in the art in view of the description. However, such various modifications and adaptations fall within the scope of the teachings of the various embodiments described above.

The embodiments described herein may be implemented in, for example, a method or a process, an apparatus, a software program, a data stream, or a signal. Even if only discussed in the context of a single form of implementation (for example, discussed only as a method), the implementation of features discussed above may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described embodiments. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired and/or wireless links, as is known. The signal may be stored on a processor-readable medium.

The invention claimed is:

1. A method of generating an extrapolated image that extends beyond a border of an image, the method comprising:
   accessing a border portion of the image;
   generating a first extrapolated image based on a resizing of the border portion of the image, wherein Intra prediction is used to determine an estimated angle of prediction of a block on the border, and a predicted block is propagated in the first extrapolated image at the estimated angle;
   generating the extrapolated image based on prediction and weighting determined from blocks of the first extrapolated image, wherein the extrapolated image is higher resolution than the first extrapolated image.

2. The method according to claim 1, wherein the border portion of the image is resized to fit a size of an extension portion to be displayed adjacent the border of the image, horizontally flipped and blurred.

3. The method according to claim 1, wherein generation of the extrapolated image is further performed based on prediction and weighting of overlapping blocks to be included in the extrapolated image, including using a block matching algorithm to determine at least one matching block in the image.

4. The method according to claim 3, wherein Local Linear Embedding is used to determine the weights of the blocks to be included in the extrapolated image.

5. The method according to claim 3, further including blending the overlapping blocks included in the extrapolated image using previously determined blocks of the extrapolated image.

6. The method according to claim 1, further comprising generating a second extrapolated image based on prediction determined from the extrapolated image, wherein the second extrapolated image is higher resolution than the extrapolated image, and wherein the steps of generating of a higher resolution extrapolation image than a previous extrapolation image is repeated N number of times.

7. The method according to claim 1, further comprising generating extrapolated images for the top, left, and right edges, respectively, of the image.

8. An apparatus for generating an extrapolated image that extends beyond a border of an image, comprising:
   an input configured to access an image; and
   at least one processor configured to access a border portion of the image; generate a first extrapolated image based on a resizing of the border portion of the image, wherein Intra prediction is used to determine an estimated angle of prediction of a block on the border and a predicted block is propagated in the first extrapolated image at the estimated angle; and generate the extrapolated image based on prediction and weighting determined from blocks of the first extrapolated image, wherein the extrapolated image is higher resolution than the first extrapolated image.

9. The apparatus according to claim 8, wherein the border portion of the image is resized to fit a size of an extension portion to be displayed adjacent the border of the image horizontally flipped and blurred.

10. The apparatus according to claim 8, wherein the processor is configured to generate the extrapolated image based on prediction and weighting of overlapping blocks to be included in the extrapolated image, including using a block matching algorithm to determine at least one matching block in the image.

11. The apparatus according to claim 10, wherein the processor is configured to determine the weights of the blocks to be included in the extrapolated image using Local Linear Embedding.

12. The apparatus according to claim 10, wherein the processor is configured to generate the extrapolated image by blending the overlapping blocks included in the extrapolated image using previously determined blocks of the extrapolated image.

13. The apparatus according to claim 8, wherein the processor is further configured to generate a second extrapolated image based on prediction determined from the extrapolated image, wherein the second extrapolated image is higher resolution than the extrapolated image, and repeating the process of generating a higher resolution extrapolation image than a previous extrapolation image for N number of times.

14. The apparatus according to claim 8, wherein the processor is configured to generate extrapolated images for the top, left, and right edges, respectively, of the image.

15. A non-transitory computer-readable storage media, comprising computer-executable instructions for:
   accessing a border portion of the image;
   generating a first extrapolated image based on a resizing of the border portion of the image, wherein Intra prediction is used to determine an estimated angle of prediction of a block on the border, and a predicted block is propagated in the first extrapolated image at the estimated angle; and
   generating the extrapolated image based on prediction and weighting determined from blocks of the first extrapolated image, wherein the extrapolated image is higher resolution than the first extrapolated image.

16. A non-transitory computer-readable storage media, comprising an extrapolated image that extends beyond a border of an image, wherein
   the extrapolated image is based on prediction and weighting determined from blocks of a first extrapolated image;
   the first extrapolated image is based on a resizing of a border portion of the image, wherein Intra prediction is used to to determine an estimated angle of prediction of a block on the border, and a predicted block is propagated in the first extrapolated image at the estimated angle; and
   the extrapolated image is higher resolution than the first extrapolated image.

\* \* \* \* \*